United States Patent [19]

Iwamaru et al.

[11] Patent Number: 5,698,477
[45] Date of Patent: Dec. 16, 1997

[54] ADHESIVE CLOTH TAPE FOR A WIRING HARNESS

[75] Inventors: Takashi Iwamaru; Shigeo Uchida, both of Kanagawa; Minoru Fujita, Utsunomiya, all of Japan

[73] Assignees: Sliontec Corporation, Kanagawa; Sumitomo Wiring Systems, Ltd., Yokkaichi, both of Japan

[21] Appl. No.: 373,492

[22] Filed: Jan. 17, 1995

Related U.S. Application Data

[63] Continuation of Ser. No. 778,071, May 20, 1992, abandoned.

[30] Foreign Application Priority Data

Apr. 12, 1990 [JP] Japan ........................ 2-38512

[51] Int. Cl.⁶ .................... C09J 7/02; B32B 5/08
[52] U.S. Cl. ............... 442/136; 428/36.1; 428/921; 428/343; 442/149; 442/151; 442/208; 442/209
[58] Field of Search .................... 428/262, 264, 428/920, 921, 258, 259, 261, 343, 36.1; 442/136, 149, 151, 208, 209

[56] References Cited

U.S. PATENT DOCUMENTS

| 2,523,865 | 9/1950 | Dildilian | 428/258 |
|---|---|---|---|
| 3,941,162 | 3/1976 | McCabe et al. | 428/259 X |
| 4,207,374 | 6/1980 | Groff | 428/261 |
| 4,304,813 | 12/1981 | Elmore, Jr. | 428/261 X |
| 4,439,482 | 3/1984 | Suematsu | 428/258 |
| 4,530,876 | 7/1985 | Brodmann et al. | 428/258 X |
| 4,654,254 | 3/1987 | Gerry et al. | 428/252 |
| 4,663,223 | 5/1987 | Schweyer | 428/258 |
| 4,703,134 | 10/1987 | Uematsu | 174/106 SC |
| 4,987,026 | 1/1991 | Jacobs et al. | 428/258 X |
| 5,047,285 | 9/1991 | Ward | 428/258 X |

FOREIGN PATENT DOCUMENTS

| 60-71735 | 4/1985 | Japan . | |
|---|---|---|---|
| 60-110776 | 6/1985 | Japan . | |
| 62-28436 | 2/1987 | Japan . | |
| 62-124178 | 6/1987 | Japan . | |
| 62-283182 | 12/1987 | Japan | 428/258 |

*Primary Examiner*—Marion E. McCamish
*Assistant Examiner*—Blaine R. Copenheaver
*Attorney, Agent, or Firm*—Birch, Stewart, Kolasch & Birch, LLP

[57] ABSTRACT

The present invention provides an adhesive cloth tape for bundling the component wires of a wiring harness for use, for example, on an automobile. Conventional adhesive polyvinyl chloride tapes and adhesive acetate cloth tapes have problems that wiring harnesses bundled by these adhesive tapes generate fluttering and rustling noise while the automobile is running, and conventional adhesive cotton cloth tapes reduce the efficiency of bundling work because these tapes have high tear strength, though their noise preventing performance is excellent. The present invention provides an adhesive cloth tape solving the foregoing problems in the conventional adhesive cloth tapes, having a tensile strength of 8 kgf/19 mm or higher with respect to the direction of its length, and comprising: a woven base cloth of 0.2 mm or above in thickness, consisting of yarns, as warp yarns, having a strength in the range of 80 to 200 g, and spun yarns or texturized filament yarns, as weft yarns, having a strength not lower than that of the warp yarns.

4 Claims, 1 Drawing Sheet

ADHESIVE CLOTH TAPE FOR A WIRING HARNESS

This application is a continuation of application Ser. No. 07/778,071 filed on May 20, 1992, now abandoned.

TECHNICAL FIELD

The present invention relates to an adhesive cloth tape for bundling the insulated conductors of a wiring harness and, more particularly, to an adhesive cloth tape for a wiring harness, having excellent ability to prevent noise generation by the wiring harness as mounted on an automobile and to facilitate wire bundling work (capability of being easily torn off).

BACKGROUND ART

Most conventional adhesive tapes for bundling the insulated conductors of a wiring harness employ a polyvinyl chloride tape as a base. Recently, demand for the use of adhesive cloth tapes for bundling the insulated conductors of wiring harnesses have progressively increased with a view to improving the comfortableness of automobiles through the reduction of noise generated by the fluttering and rustling of the wiring harness, because the cushioning performance of adhesive cloth tapes is more effective than that of adhesive polyvinyl chloride tapes. Currently used adhesive cloth tapes include adhesive cotton cloth tapes for electrical insulation and adhesive acetate cloth tapes.

Adhesive tapes for wiring harnesses must be flame retardant to secure safety for fire prevention.

TECHNICAL PROBLEMS

The base cloth of the adhesive cotton cloth tape for electrical insulation among the conventional adhesive cloth tapes, in general, is woven by using warp yarns of 30's and weft yarns of 30's or 36's (yarn count is the length in kilometer of yarn of 1 kg in weight). Although an adhesive cotton cloth tape using such a cotton cloth as a base cloth has excellent ability to prevent noise, its tearing strength is high. Therefore, the adhesive cotton cloth tape is hard to tear as compared with the conventional adhesive polyvinyl chloride tape and reduces remarkably the efficiency of bundling work for bundling the component wires of a wiring harness.

The adhesive acetate cloth tape is easy to tear because the warp yarns of the acetate base cloth have a comparatively low strength. However, since both the warp yarns and the weft yarns of the acetate base cloth are filament yarns, the adhesive acetate cloth tape is inferior to the adhesive cotton cloth tape in cushioning performance, and its noise preventing performance is unsatisfactory.

A method of improving the tearing easiness of the adhesive cotton cloth tape coats the surface of the base cloth with a resin, such as polyethylene. However, the coating of the surface of the base cloth with a resin deteriorates the noise preventing ability of the adhesive cotton cloth tape, because the backside of the adhesive cotton cloth tape is formed of a film, which is similar to the backside of the adhesive polyvinyl chloride tape.

As stated above, an adhesive tape for bundling the component wires of a wiring harness, having excellent noise preventing ability and excellent tearing easiness that enables bundling work at a working efficiency corresponding to that at which bundling work can be carried out when the conventional adhesive polyvinyl chloride tape is used has not been available.

Accordingly, it is an object of the present invention to provide an adhesive cloth tape for bundling the component wires of a wiring harness, solving the problems in the prior art, having excellent ability to prevent generation of noise by a wiring harness as mounted on an automobile, and facilitating bundling work in fabricating a wiring harness.

SUMMARY OF THE INVENTION

The object of the invention can be achieved by an adhesive cloth tape having a tensile strength of 8 kgf/19 mm or higher with respect to the direction of the warp yarns for bundling the component wires of a wiring harness, and employing a woven base cloth of a thickness of 0.2 mm or above consisting of yarns having a strength in the range of 80 to 200 gf as warp yarns, and spun yarns or texturized filament yarns having a strength not lower than that of the warp yarns as weft yarns.

The base cloth and/or the adhesive is flame retardant.

The base cloth consisting of the warp yarns having a strength in the range of 80 to 200 gf and the weft yarns having a strength not lower than that of the warp yarns improves the tearing easiness of the adhesive cloth tape, and the use of the weft yarns having a strength not lower than that of the warp yarns prevents the longitudinal tearing of the adhesive cloth tape. The tensile strength of 8 kgf/19 mm or above of the adhesive cloth tape with respect to the direction of the warp yarns is sufficiently high for bundling the component wires of a wiring harness.

The use of spun yarns or texturized filament yarns as the weft yarns secures sufficiently high cushioning ability. The thickness of 0.2 mm or above of the base cloth further improves the cushioning effect.

The back surface of the adhesive tape may be finished by a process for improving the unwinding property of the adhesive tape. Desirably, the back surface of the adhesive tape is coated properly with a release agent, such as silicone, so that the cushioning effect of the base cloth may not be spoiled.

The adhesive cloth tape thus constructed in accordance with the present invention solves the problems in the prior art, has excellent ability to prevent generation of noise by a wiring harness as mounted on an automobile, and facilitates bundling work for bundling the component wires of a wiring harness.

Although the adhesive cloth tape in accordance with the present invention has been described as applied to bundling the component wire of a wiring harness to be used on an automobile, naturally, the adhesive cloth tape in accordance with the present invention is applicable to general wiring harnesses.

Figure 1:
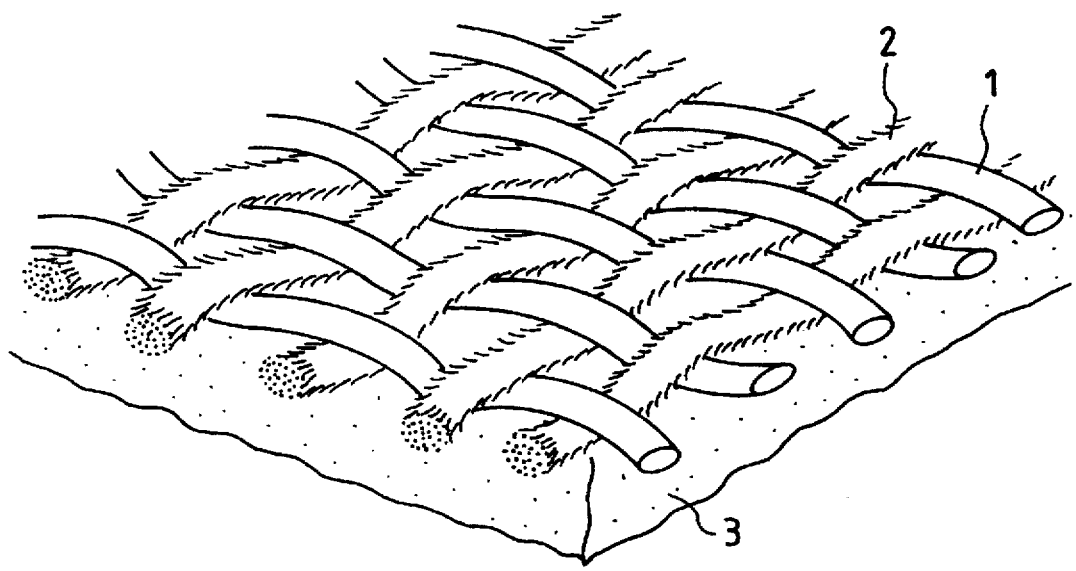
FIG. 1 is an enlarged typical perspective view of an adhesive cloth tape embodying the present invention for bundling the component wires of a wiring harness.

1 . . . Warp yarn
2 . . . Weft yarn
3 . . . Adhesive

BEST MODE FOR CARRYING OUT THE INVENTION

Examples of adhesive cloth tapes in accordance with the present invention and comparative examples of adhesive cloth tapes will be described hereinafter.

EXAMPLE 1

An adhesive cloth tape was fabricated by coating a woven cloth of 0.28 mm in thickness, 68 end/25.4 mm in end spacing and 68 end/25.4 mm in pick spacing with a flame retardant adhesive. The woven fabric consists of 40's cotton yarns of 176 gf in strength as warp yarns and 20's cotton yarns of 343 gf in strength as weft yarns.

EXAMPLE 2

An adhesive cloth tape was fabricated by coating a woven cloth of 0.25 mm in thickness, 71 end/25.4 mm in end spacing and 49 pick/25.4 mm in pick spacing with a flame retardant adhesive. The woven fabric consists of 75 denier acetate filament yarns of 97 gf in strength as warp yarns and 10's cotton yarns of 699 gf in strength as weft yarns.

COMPARATIVE EXAMPLE 1

An adhesive cloth tape was fabricated by coating a woven fabric of 0.22 mm in thickness, 71 end/25.4 mm in end spacing and 69 pick/25.4 mm in pick spacing with a flame retardant adhesive. The woven fabric consists of 30's cotton yarns of 236 gf in strength as warp yarns and 36's cotton yarns of 200 gf in strength as weft yarns.

COMPARATIVE EXAMPLE 2

An adhesive cloth tape was fabricated by coating a woven fabric of 180 end/25.4 mm in end spacing and 65 pick/25.4 mm in pick spacing with a flame retardant adhesive. The woven fabric consists of 55 denier acetate filament yarns of 72 gf in strength as warp yarns and 150 denier acetate filament yarns as weft yarns.

Samples of the Examples 1 and 2, and the Comparative examples 1 and 2 were tested for tearing easiness, noise preventing performance and flame resistance. Test results are tabulated in Table 1.

TABLE 1

|  | Examples | | Comparative examples | |
|---|---|---|---|---|
|  | 1 | 2 | 1 | 2 |
| Tearing easiness | Good | Good | Not good | Bad |
| Noise preventing performance | Good | Good | Good | Not good |
| Fire resistance | Good | Good | Good | Good |

As is obvious from Table 1, both Examples 1 and 2 are satisfactory in tearing easiness, noise preventing performance and flame resistance. Comparative example 1 is satisfactory in noise preventing performance and flame resistance though, its tearing easiness is unsatisfactory. Comparative example 2 is unsatisfactory in noise preventing performance, which is due to its insufficient thickness of the base cloth. Comparative example 2 was torn when pulled for bundling, which is due to the excessively low strength of the warp yarns of the base cloth.

We claim:

1. An adhesive cloth tape for bundling the component wires of a wiring harness comprising:

a woven base cloth of 0.2 mm or above in thickness, consisting of yarns having a strength of about 176 gf in a 40's cotton yarn as warp yarn and spun yarns of cotton 20's and about 343 gf in strength as weft yarn and an adhesive coating one major surface of the woven base cloth wherein said woven base cloth and/or said adhesive coating is flame-retardant, said adhesive cloth tape having a tensile strength of 8 kgf/19 mm or higher with respect to the direction of its length and good cushioning and noise preventing performance.

2. An adhesive cloth tape for bundling the component wires of a wiring harness comprising:

a woven base cloth of 0.2 mm or above in thickness, consisting of a warp yarn of 75 denier acetate filament of about 97 gf in strength and a weft yarn of 10's cotton of about 699 gf in strength, and an adhesive coating one major surface of the woven base cloth wherein said woven base cloth and/or said adhesive coating is flame-retardant, said adhesive cloth tape having a tensile strength of 8 kgf/19 mm or higher with respect to the direction of its length and good cushioning and noise preventing performance.

3. A flame-retardant adhesive cloth tape for bundling the component wires of an automobile wiring harness, having a tensile strength of 8 kgf/19 mm or higher with respect to the direction of its length comprising:

a woven base cloth of 0.2 mm or above in thickness wherein said base cloth contains warp yarns of about 176 gf in strength of a 40's cotton yarn and weft yarns of 20's cotton yarn of about 343 gf in strength said yarns having good cushioning and noise preventing performance.

4. A flame-retardant adhesive cloth tape for bundling the component wires of an automobile wiring harness, having a tensile strength of 8 kgf/19 mm or higher with respect to the direction of its length comprising:

a woven base cloth of 0.2 mm or above in thickness wherein said base cloth contains a warp yarn of 75 denier acetate filament yarn of about 97 gf in strength and weft yarns of 10's cotton yarn of about 699 gf in strength, said yarns having good cushioning and noise preventing performance.

* * * * *